United States Patent
Haselbeck

(10) Patent No.: US 11,376,962 B2
(45) Date of Patent: Jul. 5, 2022

(54) TEST DRIVE MODE FOR A VEHICLE

(71) Applicant: AUDI AG, Ingolstadt (DE)

(72) Inventor: Florian Haselbeck, Landau (DE)

(73) Assignee: Audi AG, Ingolstadt (DE)

( * ) Notice: Subject to any disclaimer, the term of this patent is extended or adjusted under 35 U.S.C. 154(b) by 151 days.

(21) Appl. No.: 16/766,854

(22) PCT Filed: Apr. 30, 2019

(86) PCT No.: PCT/EP2019/061006
§ 371 (c)(1),
(2) Date: May 26, 2020

(87) PCT Pub. No.: WO2019/219370
PCT Pub. Date: Nov. 21, 2019

(65) Prior Publication Data
US 2021/0016662 A1    Jan. 21, 2021

(30) Foreign Application Priority Data
May 14, 2018    (DE) ..................... 10 2018 207 381.3

(51) Int. Cl.
*B60K 35/00*    (2006.01)
*G09B 19/16*    (2006.01)
(Continued)

(52) U.S. Cl.
CPC ............. *B60K 35/00* (2013.01); *G06Q 10/10* (2013.01); *G06Q 30/0282* (2013.01);
(Continued)

(58) Field of Classification Search
CPC .............. B60K 35/00; B60K 2370/161; B60K 2370/152; B60K 2370/12; G06Q 10/10; G06Q 30/0282; G09B 19/167
See application file for complete search history.

(56) References Cited

U.S. PATENT DOCUMENTS 9,697,503 B1    7/2017    Penilla et al.
10,096,263 B2    10/2018    Jain et al.
(Continued)

FOREIGN PATENT DOCUMENTS

AU    2013101587 A4 *    1/2014
CN    103778547 A    5/2014
(Continued)

OTHER PUBLICATIONS

International Preliminary Report on Patentability directed to related International Patent Application No. PCT/EP2019/061006, completed Mar. 25, 2020, with attached English-lauguage translation; 11 pages.
(Continued)

*Primary Examiner* — Chico A Foxx
(74) *Attorney, Agent, or Firm* — Sterne, Kessler, Goldstein & Fox P.L.L.C.

(57) ABSTRACT

The disclosure relates to a multimedia device for a vehicle, having a test drive application which can be executed during a test drive of the vehicle. The test drive application is configured to interact with a test driver during the test drive of the vehicle and to activate at least one functional system of the vehicle for test purposes. The test drive application is further configured to query a feedback of the test driver for each functional system activated for test purposes.

9 Claims, 2 Drawing Sheets

(51) Int. Cl.
*G06Q 30/02* (2012.01)
*G06Q 10/10* (2012.01)

(52) U.S. Cl.
CPC ........ *G09B 19/167* (2013.01); *B60K 2370/12* (2019.05); *B60K 2370/152* (2019.05); *B60K 2370/161* (2019.05)

(56) References Cited

U.S. PATENT DOCUMENTS

| | | | |
|---|---|---|---|
| 10,692,126 B2 | 6/2020 | Li et al. | |
| 11,024,193 B1* | 6/2021 | Saxton | G09B 9/052 |
| 2005/0233733 A1 | 10/2005 | Roundtree et al. | |
| 2009/0069972 A1 | 3/2009 | Templeton et al. | |
| 2011/0099036 A1* | 4/2011 | Sarkissian | G06Q 10/02 |
| | | | 705/5 |
| 2014/0129080 A1* | 5/2014 | Leibowitz | B60R 16/0231 |
| | | | 705/26.7 |
| 2015/0030998 A1 | 1/2015 | Liu et al. | |
| 2015/0093722 A1* | 4/2015 | Fitzgerald | G09B 9/04 |
| | | | 434/62 |
| 2015/0210272 A1* | 7/2015 | Edgren | B60W 50/10 |
| | | | 701/23 |
| 2015/0210287 A1 | 7/2015 | Penilla et al. | |
| 2015/0353093 A1* | 12/2015 | Pallett | B60W 10/06 |
| | | | 701/48 |
| 2016/0068169 A1* | 3/2016 | Goldman-Shenhar | B60W 50/14 |
| | | | 706/46 |
| 2016/0371759 A1 | 12/2016 | Wilson et al. | |
| 2017/0061826 A1* | 3/2017 | Jain | G09B 19/167 |
| 2017/0169398 A1* | 6/2017 | Washington | G06Q 10/08 |
| 2017/0301260 A1 | 10/2017 | Gussen et al. | |
| 2018/0319408 A1* | 11/2018 | Hoetzer | G05D 1/0061 |
| 2019/0225232 A1* | 7/2019 | Blau | B60W 50/0098 |
| 2021/0065275 A1* | 3/2021 | Denthumdas | G06Q 30/0627 |

FOREIGN PATENT DOCUMENTS

| | | | | |
|---|---|---|---|---|
| CN | 107038588 A | 8/2017 | | |
| DE | 102006049965 A1 | 10/2007 | | |
| DE | 102012008260 A1 | 12/2012 | | |
| DE | 102012220321 A1 | 6/2014 | | |
| DE | 102014213998 A1 | 1/2015 | | |
| DE | 102014013409 A1 | 3/2015 | | |
| DE | 102013021867 A1 | 6/2015 | | |
| DE | 102016116274 A1 | 3/2017 | | |
| DE | 102016206372 A1 | 10/2017 | | |
| EP | 2902864 A1 * | 8/2015 | ............ | G06F 3/016 |
| JP | 2004178071 A | 6/2004 | | |
| WO | WO 2014/125342 A1 | 8/2014 | | |

OTHER PUBLICATIONS

International Search Report and Written Opinion of the International Searching Authority directed to related International Patent Application No. PCT/EP2019/061006, dated Dec. 2, 2019 with attached English-language translation; 14 pages.

* cited by examiner

TEST DRIVE MODE FOR A VEHICLE

TECHNICAL FIELD

The disclosure relates to a multimedia device for a vehicle, having a test drive application which can be executed during a test drive of the vehicle. The test drive application can be configured to interact with a test driver during the test drive of the vehicle and to activate at least one functional system of the vehicle for test purposes.

BACKGROUND

Modern vehicles usually include a multimedia device (multimedia interface, MMI) and a large number of partially complex functional systems, which can be configured as driver assistance systems or as comfort systems and are controlled by a control unit (electronic control unit, ECU) of the vehicle via a bus system.

Due to the complexity and the large number of functional systems installed in the vehicle, a driver of such a vehicle can be overwhelmed with the operation of the vehicle, i.e. with the operation of the functional systems, and can operate a functional system incorrectly or fail to activate a functional system despite an advantageous effect.

To alleviate this disadvantage, DE 10 2006 049 965 A1 discloses a device and a method for interactively instructing a driver of a vehicle. In the method, depending on a driving and/or a driver situation, which is continuously determined by evaluating recorded status data, the driver is shown suitable information, and/or assistance in real time on a multimedia device.

DE 10 2016 116 274 A1 goes one step further, which discloses a method for the guided testing of a driver assistance system of a vehicle. In the method, a driver selects a driver assistance system to be tried out using a multimedia device. An instruction application simulates the effect of the selected driver assistance system and can instruct an expected behavior of the driver corresponding to the effect. During the simulation, the instruction application compares an actual behavior of the driver with the expected behavior and provides the driver with feedback based on the comparison.

However, the solutions described above relate to use of the vehicle after the vehicle has been purchased. Before the purchase of a vehicle, on the other hand, there is a fundamentally different situation, which entails correspondingly different questions.

A potential buyer of a vehicle is often unaware of the functions and effects of many, especially novel, functional systems of a vehicle. Or else, the buyer only knows them abstractly and has not yet consciously experienced their effect. In addition, the information which is abstractly known to the buyer may also be incorrect or at least inaccurate, since he/she did not receive it first-hand, but from friends, colleagues, or even known employees of a vehicle manufacturer, who generally do not know every functional system of every vehicle series in detail.

Since at least some of the functional systems can be provided as special equipment of the vehicle, which entails an increased purchase price and thus an increased turnover and profit for the manufacturer when the vehicle is purchased, there is a strong interest on the part of the manufacturer to present a potential buyer with as many available functional systems of the vehicle as possible prior to a purchase in an interesting manner.

A vehicle dealer usually offers a potential buyer the opportunity to test drive the vehicle of his/her interest before the purchase of a vehicle. However, there is a risk that the test driver will be distracted by many new impressions during the test drive and fail to adequately and consciously try out the often hardly manageable variety of functional systems.

To counteract this, DE 10 2014 013 409 A1 discloses a method for demonstrating at least one driver assistance system of a vehicle. To carry out the method, the vehicle is put into a demonstration mode. During a demonstration drive, a driver of the vehicle receives the suggestion to try out one or more driver assistance systems installed in the vehicle based on a predetermined list, wherein it is also possible to try out a driver assistance system multiple times. In the demonstration mode, it is stored and displayed on a multimedia device which driver assistance systems have already been tried and which driver assistance systems are still available for trial.

The described method can indeed be carried out during a test drive and can also help the test driver to actually try out all or at least as many driver assistance systems as possible. However, it offers little support to the test driver. The vehicle dealer also receives no support for a sales conversation with the test driver, which usually occurs after the test drive.

DETAILED DESCRIPTION

Figure 1:
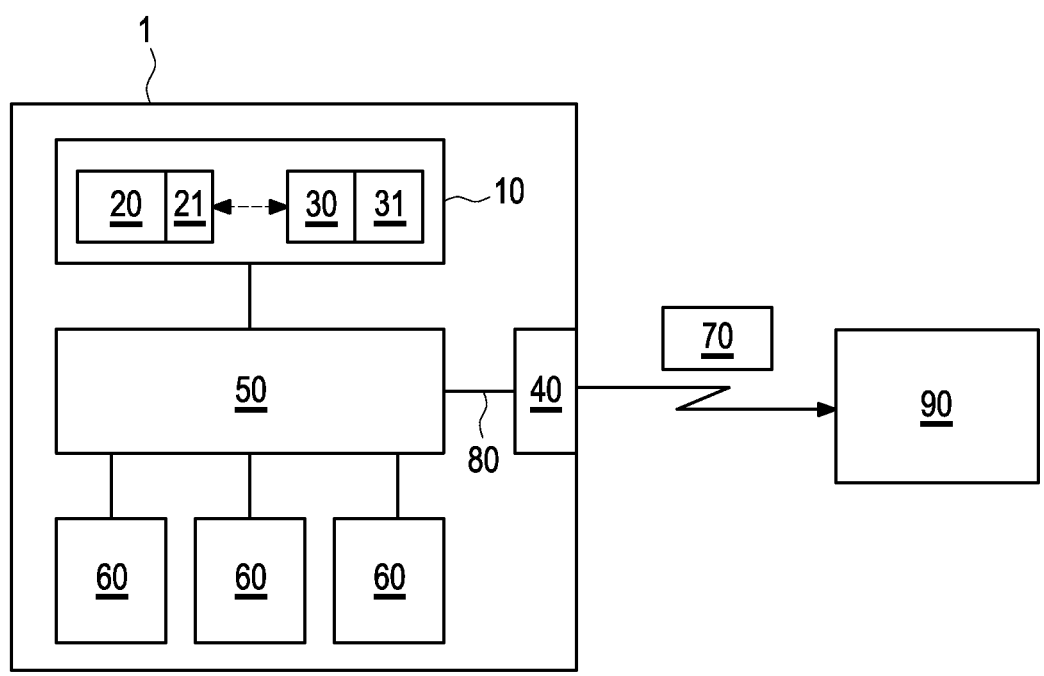
FIG. 1 is a schematic representation of an embodiment of a multimedia device according to some embodiments of the present disclosure.

The present disclosure is based on the object of providing an improved multimedia device which avoids the disadvantages described and allows a more efficient sales discussion after a test drive. In addition, it is an object of the present disclosure to provide a method for operating such a multimedia device.

An object of the present disclosure is a multimedia device for a vehicle, including a test drive application which can be executed during a test drive of the vehicle and is configured to interact with a test driver during the test drive of the vehicle and to activate at least one functional system of the vehicle for test purposes. The multimedia device, at least one functional system, and at least one control unit assigned to the functional devices are connected to a bus system of the vehicle. By installing the test drive application, the multimedia device is additionally enabled to initiate a control unit during the test drive to activate the functional system assigned to the control unit for test purposes, i.e. for trial by the test driver. Using the test drive application, a range of functions of an existing multimedia device can be subsequently expanded in a simple manner.

The multimedia device according to the disclosure is configured to query feedback from the test driver for each functional system activated for test purposes. This gives the test driver the opportunity to submit an assessment of the functional system to the multimedia device. The feedback from the test driver can be brief, i.e. be a short expression of interest in the functional system, an indifference to the functional system, or a lack of interest in the functional system. However, the test drive application can also request differentiated feedback, for example an evaluation based on a score or grading system.

In some embodiments, the test drive application is configured to transmit the queried feedback from the test driver to a stationary backend system by a device of the vehicle for wireless communication. In this way, feedback from the test driver is already available on the backend system during the test drive. The backend system can be provided by a manufacturer of the vehicle or a vehicle dealer. By accessing the backend system, the vehicle dealer can obtain knowledge of the feedback from the test driver before he returns from the test drive.

In some embodiments, the test drive application is configured to be started only by a vehicle dealer. In other words, the test drive application is an application which is intended exclusively for test drives and which cannot be executed during normal driving operation of the vehicle. The vehicle dealer may need special authorization to allow the test drive application to run during a test drive.

The multimedia device can also include a digital user manual, in particular including at least one video tutorial. The test drive application has an interface to the digital user manual and is in particular configured to play the at least one video tutorial. With this configuration, the test drive application can incorporate content that is already stored in the multimedia device. This significantly reduces the scope and complexity of the test drive application.

The disclosure also relates to a method for interacting with a test driver during a test drive of a vehicle, in which the following steps are carried out by a multimedia device of the vehicle, in particular a multimedia device according to the disclosure including a test drive application:

greeting the test driver,
introducing at least one functional system of the vehicle,
suggesting an activation of the functional system for test purposes,
activating the functional system.

For welcoming the test driver, a video message can be played, for example, in which the test driver is personally addressed by a board member of the manufacturer of the vehicle or by the vehicle dealer and receives an introduction to the course of the test drive. During the test drive, various functional systems of the vehicle are presented in succession, suggested for activation for test purposes, and activated after the test driver's approval. In this way, the test driver receives information about the functional systems installed in the vehicle and can understand and experience the mode of operation thereof directly.

In the method according to the disclosure, querying the feedback of test driver takes place regarding the functional system activated for test purposes. After trying out the functional system, the test driver is given the opportunity to assess the functional system tested. For this purpose, the test drive application asks the test driver whether he/she is interested in the functional system, is indifferent to the functional system, or is not interested in the functional system. However, differentiated evaluations, for example on the basis of a points or grading system, can also be queried by the test driver.

In some embodiments, the requested feedback from the test driver is transmitted to a stationary backend system by a vehicle device for wireless communication. As a result, the feedback from the test driver regarding the functional system activated for test purposes is available in the backend system before the end of the test drive. Accordingly, the vehicle dealer who has access to the backend system can prepare specifically for a sales discussion with the test driver after the test drive.

In some embodiments, an operating mode, and/or a functional mode of the functional system is explained when presenting, in particular by playing a video tutorial of a digital user manual. Before a trial, the test driver receives relevant information about the functional system presented, so that during the trial, he can consciously perceive and experience the effect of the functional system.

A functional system of special equipment is advantageously presented, suggested, and/or activated for test purposes. This gives the test driver a basis on which to decide whether to purchase special equipment that entails additional costs.

In some embodiments, the functional system is presented, suggested, and/or activated for test purposes, depending on a driving situation of the vehicle. Through a sensor system provided in the vehicle, the driving situation of the vehicle can be continuously recorded during the test drive. A functional system that matches the driving situation can then be tried out in a specific driving situation. In other words, it is ensured that the test driver experiences each functional system in the intended context thereof.

In some embodiments, the test drive application is started by a vehicle dealer before the test drive starts. The test drive application should only be used during a test drive, i.e. before the purchase of the vehicle, and must therefore be activated and started by the vehicle dealer.

The disclosure is represented schematically with reference to an embodiment in the drawing and will be further described with reference to the drawing.

FIG. 1 shows a schematic representation of an embodiment of a multimedia device 10 (multimedia interface, MMI) according to the disclosure, which is installed in a vehicle 1. The vehicle 1 further includes a control unit 50 (Electronic Control Unit, ECU), a plurality of functional systems 60, a device 40 for wireless communication and a bus system 80 to which the multimedia device 10, the control device 50, the functional systems 60, and the device 40 are connected for wireless communication.

The multimedia device 10 includes a digital user manual 30 having a plurality of video tutorials 31, which relate to the functional systems 60, and a test drive application 20 which can be executed during a test drive of the vehicle 1 and which has an interface 21 to the digital user manual 30 and is configured to play video tutorials 31 and interact with a test driver during the test drive of the vehicle 1.

The test drive application 20 is further configured to be started exclusively by a vehicle dealer, to activate at least one functional system 60 of the vehicle 1 for test purposes, to query feedback 70 from the test driver for each functional system 60 activated for test purposes, and to use the device 40 for wireless communication to transfer the queried feedback 70 of the test driver to a stationary backend system 90. The backend system 90 may be provided by a manufacturer of the vehicle or by a vehicle dealer. In any case, the vehicle dealer can access the backend system 90.

Figure 2:
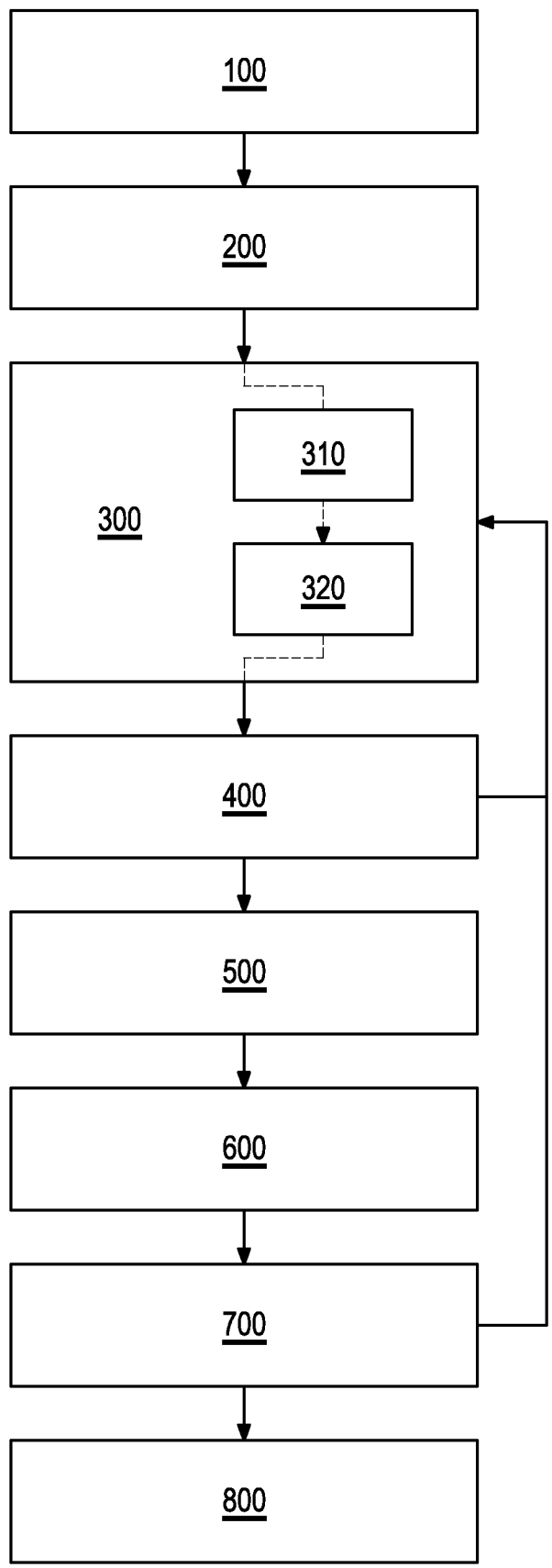
FIG. 2 is a flowchart of an embodiment of the method according to the present disclosure.

FIG. 2 shows a flow chart of an embodiment of the method according to the disclosure for interacting with a test driver during a test drive of a vehicle 1. Before the start of the test drive, the test drive application 20 installed in the multimedia device 10 is started at step 100 by a vehicle dealer. During the test drive, the test drive application 20 carries out the following steps:

First, the test driver is greeted at step 200 by the multimedia device 10. The greeting takes place by playing a video stored in the multimedia device 10, which shows, for example, an introductory speech by a board member of the manufacturer of the vehicle 1 or of the vehicle dealer. Alternatively, the test drive application 20 can also greet the test driver at step 200 in a different way, for example by displaying a welcome text.

A functional system 60 of the vehicle 1 is then presented at step 300, in which an operation and functional principle of the functional system 60 is explained at step 310. For this purpose, at step 320 the test drive application 20 accesses and plays a video tutorial 31 of the digital user manual 30 relating to the functional system 60 via the interface 21. If no video tutorial 31 is available for the functional system 60, the explanation at step 310 can be limited to a displayed or spoken text.

After the presentation at step 300 of the functional system 60, the test drive application 20 suggests to the test driver to activate the presented functional system 60 for test purposes at step 400. If the test driver follows the suggestion at step 400, the functional system 60 is activated at step 500. The test driver can, however, reject the suggestion at step 400, so that activating at step 500 of the functional system 60 is omitted and a further remaining functional system 60 is presented at step 300.

If possible, each functional system 60 of the vehicle 1 is presented at step 300, suggested at step 400 and activated at step 500 by the test drive application 20 for test purposes, depending on a driving situation of vehicle 1. Functional systems 60 are primarily presented at step 300, suggested at step 400, and activated at step 500 for test purposes, which form a special equipment of vehicle 1.

After the activation at step 500 for test purposes of the functional system 60, the test drive application 20 queries feedback 70 at step 600 from the test driver regarding the functional system 60 activated for test purposes. Feedback 70 from the test driver can include an interest in the functional system 60, an indifference to the functional system 60, or a lack of interest in the functional system 60. It goes without saying that the test driver can interact with the multimedia device 10 in all known or future ways.

Furthermore, during the test drive, the queried feedback 70 from the test driver is wirelessly transmitted at step 700 to the backend system 90 by the device 40 of the vehicle 1 for wireless communication, so that the vehicle dealer already receives knowledge of the feedback 70 from the test driver before the test drive is completed. The above steps 300, 400, 500, 600, 700 are then repeated as long as other functional systems 60 of the vehicle remain and the test drive continues.

After the test driver returns, the test drive application 20 is terminated at step 800 by the vehicle dealer.

An advantage of the multimedia device according to the disclosure is that the test driver receives first-hand information that has been secured for each functional system and can experience the effect of the functional system in an informed manner. A further advantage can be seen that the test driver gets to know every functional system installed in the vehicle during the test drive and can therefore safely make a well-founded decision regarding the purchase of special equipment that includes a specific functional system. Apart from this, the test drive application can be used to intensify and make positive contact with the test driver—and possible future customer. The vehicle dealer also benefits from the test drive application by being sure that the test driver receives all the information that is relevant for a purchase decision and has personal experiences during the test drive, which allows a better sales conversation after the test drive.

LIST OF REFERENCE SIGNS 1 vehicle
10 multimedia device
20 test drive application
21 interface
30 digital user manual
31 video tutorial
40 device for wireless communication
50 control unit
60 functional system
70 feedback
80 bus system
90 backend system
100 starting
200 greeting
300 presenting
310 explaining
320 playing
400 suggesting
500 activating
600 querying
700 submitting

The invention claimed is:

1. A multimedia device for a vehicle, comprising:
a digital user manual, comprising a video tutorial for each functional system of the vehicle; and
a test drive application executable during a test drive of the vehicle before a purchase, wherein:
the test drive application is configured to:
interact with a test driver during the test drive of the vehicle;
activate at least one functional system of the vehicle for test purposes; and
query a feedback of the test driver for the at least one functional system activated for test purposes to assist the test driver to make a purchase decision of the at least one functional system; and
the test drive application comprises an interface to the digital user manual and is further configured to play the video tutorial for each functional system via the interface for the test driver.

2. The multimedia device according to claim 1, wherein the test drive application is further configured to transmit the queried feedback of the test driver to a backend system by a device of the vehicle.

3. The multimedia device according to claim 1, wherein the test drive application is further configured to be started by a vehicle dealer.

4. A method for interacting with a test driver during a test drive through a test drive application of a multimedia device of a vehicle, the multimedia device comprising the test drive application that can be executed during the test drive of the vehicle before a purchase, that is configured to interact with the test driver during the test drive of the vehicle, and that is configured to activate a functional system of the vehicle for test purposes and to query a feedback of the test driver for each functional system activated for test purposes, the method comprising:
greeting the test driver;
playing a video tutorial of a digital user manual in the multimedia device to present the functional system of the vehicle;
suggesting an activation of the functional system for test purposes;
activating the functional system; and querying the feedback from the test driver regarding the functional system activated for test purposes to assist the test driver to make a purchase decision of the at least one functional system.

5. The method according to claim 4, further comprising: transmitting the queried feedback of the test driver by a device of the vehicle for wireless communication to a backend system.

6. The method according to claim 4, wherein the presenting the functional system comprises explaining an operation and/or functional principle of the functional system.

7. The method according to claim 4, wherein the presenting the functional system comprises presenting a functional system of a special equipment.

8. The method according to claim 4, wherein the presenting the functional system comprises presenting the functional system depending on a driving situation of the vehicle.

9. The method according to claim 4, further comprising: starting the test drive application by a vehicle dealer before the test drive.

\* \* \* \* \*